(12) United States Patent
Kornbluth et al.

(10) Patent No.: US 7,934,926 B2
(45) Date of Patent: May 3, 2011

(54) GASEOUS FUEL BURNER

(75) Inventors: Kurt L. Kornbluth, San Francisco, CA (US); Michael G. Norris, Manchester, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 981 days.

(21) Appl. No.: 11/122,447

(22) Filed: May 5, 2005

(65) Prior Publication Data

US 2005/0250062 A1  Nov. 10, 2005

Related U.S. Application Data

(60) Provisional application No. 60/568,629, filed on May 6, 2004.

(51) Int. Cl.
*F23N 1/00* (2006.01)
(52) U.S. Cl. ............... 431/79; 431/75; 431/11; 431/12; 431/215; 431/243; 431/350
(58) Field of Classification Search .................. 431/350, 431/79, 11, 12, 215, 243, 75
See application file for complete search history.

(56) References Cited

U.S. PATENT DOCUMENTS

| | | | | |
|---|---|---|---|---|
| 55,516 | A | * | 6/1866 | Winans et al. |
| 120,222 | A | * | 10/1871 | Van Emon |
| 124,805 | A | * | 3/1872 | Fryer |
| 321,313 | A | * | 6/1885 | Pinkham |

(Continued)

FOREIGN PATENT DOCUMENTS

DE  445033  5/1927

(Continued)

OTHER PUBLICATIONS

Eder, F. *Apparatus for Heat Transfer at Elevated Temperature, to the Working Medium of a Regenerative Thermal Engine (or "energy engine")*, Jun. 15, 1992, 20 pages.

(Continued)

*Primary Examiner* — Alfred Basichas
(74) *Attorney, Agent, or Firm* — Michelle Saquet Temple (57) ABSTRACT

An ejector, such as a venturi, facilitates the delivery of gaseous fuel to the combustion chamber of a burner. A blower forces air through the ejector, and the air flow produces a suction that draws fuel from a fuel inlet to produce a fuel-air mixture. The amount of fuel drawn from the fuel inlet is a function of the air flow such that a substantially constant fuel-air ratio is obtained over a range of air flow rates and temperatures without the need for a separate high-pressure fuel pump. The fuel-air mixture may be provided to a combustion chamber for combustion. Air from the blower may be pre-heated prior to entering the ejector, for example, using a heat exchanger that recovers some of the heat from the combusted fuel-air mixture. Air flow through the ejector may be conditioned, for example, by a swirler, to produce a tangential air flow that can increase fuel flow by increasing air velocity across the fuel inlet and/or produce a swirl-stabilized flame in the combustion chamber. The combusted fuel-air mixture may be provided to a thermal load, such as an external combustion engine. Blower speed may be controlled manually or automatically to control power output. Fuel flow to the ejector can be controlled manually or automatically to control fuel-air ratio. The burner can be configured to operate with multiple fuel types, for example, using a fuel selector with fixed or variable restrictors.

29 Claims, 8 Drawing Sheets

Venturi Burner on a Stirling-Cycle Engine

Burner Schematic

U.S. PATENT DOCUMENTS

| | | | | |
|---|---|---|---|---|
| 488,373 | A | * | 12/1892 | Touch |
| 646,406 | A | * | 4/1900 | Anderson et al. |
| 1,089,651 | A | * | 3/1914 | Kovalavich |
| 1,866,702 | A | * | 4/1930 | Gehres |
| 1,769,375 | A | * | 7/1930 | Leary |
| 1,831,574 | A | * | 11/1931 | Norton |
| 1,840,389 | A | * | 1/1932 | Eubank |
| 2,170,099 | A | * | 8/1939 | Stubings |
| 2,176,657 | A | * | 10/1939 | Finch |
| 2,289,984 | A | * | 7/1942 | Mouromtseff et al. |
| 2,337,294 | A | * | 12/1943 | Cooper |
| 2,419,234 | A | * | 4/1947 | Holihan |
| 2,564,100 | A | * | 8/1951 | Du Pré |
| 2,595,457 | A | * | 5/1952 | Holm et al. |
| 2,688,228 | A | * | 9/1954 | De Brey et al. |
| 3,059,418 | A | * | 10/1962 | Johnston |
| 3,293,480 | A | * | 12/1966 | Green et al. |
| 3,431,788 | A | * | 3/1969 | De Pré et al. |
| 3,742,578 | A | * | 7/1973 | Dirne et al. |
| 3,775,973 | A | * | 12/1973 | Hudson |
| 3,782,457 | A | * | 1/1974 | Troy |
| 3,860,384 | A | * | 1/1975 | Vulliet et al. |
| 3,861,223 | A | * | 1/1975 | Braun |
| 3,924,477 | A | | 12/1975 | Portelance |
| 3,940,933 | A | | 3/1976 | Nystrom |
| 3,956,892 | A | | 5/1976 | Nystrom |
| 4,008,039 | A | | 2/1977 | Compton et al. |
| 4,020,635 | A | | 5/1977 | Joynes et al. |
| 4,041,592 | A | | 8/1977 | Kelm |
| 4,067,191 | A | | 1/1978 | Gronvall et al. |
| 4,085,588 | A | | 4/1978 | Reams et al. |
| 4,169,692 | A | | 10/1979 | McDonough et al. |
| 4,172,363 | A | | 10/1979 | Bex |
| 4,191,241 | A | | 3/1980 | Brennan |
| 4,231,222 | A | | 11/1980 | Fenton |
| 4,255,122 | A | * | 3/1981 | Alpkvist et al. ............... 431/215 |
| 4,305,457 | A | | 12/1981 | Cozzolino |
| 4,313,080 | A | | 1/1982 | Park |
| 4,330,260 | A | | 5/1982 | Jorgensen et al. |
| 4,330,992 | A | | 5/1982 | Senft |
| 4,343,350 | A | | 8/1982 | Campbell et al. |
| 4,358,268 | A | * | 11/1982 | Neville ........................ 432/180 |
| 4,364,724 | A | | 12/1982 | Alpkvist |
| 4,384,457 | A | | 5/1983 | Harvey |
| 4,387,568 | A | | 6/1983 | Dineen |
| 4,413,475 | A | | 11/1983 | Moscrip |
| 4,416,114 | A | | 11/1983 | Martini |
| 4,434,617 | A | | 3/1984 | Walsh |
| 4,442,670 | A | | 4/1984 | Goldman |
| 4,445,570 | A | | 5/1984 | Retallick |
| 4,511,805 | A | | 4/1985 | Boy-Marcotte et al. |
| 4,527,394 | A | | 7/1985 | Corey |
| 4,538,677 | A | | 9/1985 | Bódás et al. |
| 4,573,320 | A | | 3/1986 | Kralick |
| 4,633,667 | A | | 1/1987 | Watanabe et al. |
| 4,638,633 | A | | 1/1987 | Otters |
| 4,662,176 | A | | 5/1987 | Fujiwara et al. |
| 4,676,202 | A | | 6/1987 | Johnson |
| 4,736,586 | A | | 4/1988 | Kawajiri et al. |
| 4,768,341 | A | | 9/1988 | Nozaki et al. |
| 4,824,149 | A | | 4/1989 | Reuchlein |
| 4,881,372 | A | | 11/1989 | Naito |
| 4,898,142 | A | | 2/1990 | Islas |
| 4,901,790 | A | | 2/1990 | Meijer |
| 4,940,406 | A | | 7/1990 | Kee |
| 4,977,742 | A | | 12/1990 | Meijer |
| 4,996,841 | A | | 3/1991 | Meijer et al. |
| 5,003,777 | A | | 4/1991 | Berchowitz |
| 5,005,349 | A | | 4/1991 | Momose et al. |
| 5,065,579 | A | | 11/1991 | Monahan |
| 5,074,114 | A | | 12/1991 | Meijer et al. |
| 5,095,701 | A | | 3/1992 | Nakano |
| 5,148,066 | A | | 9/1992 | Beale et al. |
| 5,172,784 | A | | 12/1992 | Varela, Jr. |
| 5,174,117 | A | | 12/1992 | Naito et al. |
| 5,199,722 | A | | 4/1993 | Wada et al. |
| 5,203,170 | A | | 4/1993 | Naito |
| 5,228,293 | A | | 7/1993 | Vitale |
| 5,441,401 | A | | 8/1995 | Yamaguro et al. |
| 5,459,812 | A | | 10/1995 | Taylor |
| 5,494,135 | A | | 2/1996 | Brackett |
| 5,522,214 | A | | 6/1996 | Beckett et al. |
| 5,590,526 | A | | 1/1997 | Cho |
| 5,590,626 | A | | 1/1997 | Hitomi et al. |
| 5,596,262 | A | | 1/1997 | Boll |
| 5,642,618 | A | | 7/1997 | Pennswick |
| 5,675,974 | A | | 10/1997 | Heikrodt et al. |
| 5,697,430 | A | | 12/1997 | Thors et al. |
| 5,701,965 | A | | 12/1997 | Kamen et al. |
| 5,735,681 | A | | 4/1998 | Cheng |
| 5,743,091 | A | | 4/1998 | Penswick et al. |
| 5,755,100 | A | | 5/1998 | Lamos |
| 5,761,985 | A | | 6/1998 | Stoll |
| 5,771,694 | A | | 6/1998 | Houtman et al. |
| 5,786,640 | A | | 7/1998 | Sakai et al. |
| 5,804,947 | A | | 9/1998 | Nii et al. |
| 5,864,770 | A | | 1/1999 | Ziph et al. |
| 5,875,863 | A | | 3/1999 | Jarvis et al. |
| 5,878,570 | A | | 3/1999 | Reithofer |
| 5,881,800 | A | | 3/1999 | Chung |
| 5,920,133 | A | | 7/1999 | Penswick et al. |
| 5,921,764 | A | | 7/1999 | Marchionna et al. |
| 5,929,538 | A | | 7/1999 | O'Sullivan et al. |
| 5,945,808 | A | | 8/1999 | Kikuchi et al. |
| 5,952,813 | A | | 9/1999 | Ochiai |
| 5,954,039 | A | | 9/1999 | Doering et al. |
| 5,971,091 | A | | 10/1999 | Kamen et al. |
| 6,039,261 | A | | 3/2000 | Pavese |
| 6,050,092 | A | | 4/2000 | Genstler et al. |
| 6,062,023 | A | | 5/2000 | Kerwin et al. |
| 6,094,912 | A | | 8/2000 | Williford |
| 6,161,381 | A | | 12/2000 | Lohrmann |
| 6,161,610 | A | | 12/2000 | Azar |
| 6,247,310 | B1 | | 6/2001 | Norris et al. |
| 6,253,550 | B1 | | 7/2001 | Langenfeld et al. |
| 6,347,453 | B1 | | 2/2002 | Mitchell |
| 6,380,637 | B1 | | 4/2002 | Hsu et al. |
| 6,381,958 | B1 | | 5/2002 | Kamen et al. |
| 6,543,215 | B2 | | 4/2003 | Langenfeld et al. |
| 2001/0042373 | A1 | | 11/2001 | Bliesner et al. |
| 2003/0079665 | A1 | * | 5/2003 | Atreya ........................ 110/345 |

FOREIGN PATENT DOCUMENTS

| | | |
|---|---|---|
| DE | 1528714 | 3/1977 |
| DE | 35 00 124 A1 | 7/1986 |
| DE | 37 34 009 A1 | 10/1987 |
| DE | G 84 11 960.8 | 8/1988 |
| DE | 3721143 | 1/1989 |
| DE | 3924747 | 6/1990 |
| DE | 39 34 545 A1 | 5/1991 |
| DE | 40 18 943 A1 | 12/1991 |
| DE | 41 02 306 A1 | 8/1992 |
| DE | 42 05 283 A1 | 8/1993 |
| DE | 42 19 583 A1 | 12/1993 |
| DE | 43 08 888 A1 | 9/1994 |
| DE | 295 20 864 U1 | 5/1996 |
| DE | 197 45 167 A1 | 6/1998 |
| DE | 198 20 192 A1 | 11/1998 |
| EP | 2 609 154 | 7/1988 |
| EP | 0 458 115 A1 | 5/1991 |
| EP | 0 607 154 B1 | 7/1992 |
| EP | 0 900 328 B1 | 11/2002 |
| EP | 1342951 | 9/2003 |
| FR | 1063612 | 12/1953 |
| FR | 2 067 119 | 8/1971 |
| FR | 2 721 982 | 6/1994 |
| FR | 2794521 | 12/2000 |
| GB | 395374 | 7/1933 |
| GB | 675161 | 7/1952 |
| GB | 689484 | 3/1953 |
| GB | 704002 | 2/1954 |
| GB | 892962 | 4/1962 |
| GB | 2205934 | 12/1988 |
| IT | 500313 | 11/1954 |
| JP | 55037540 | 3/1980 |
| JP | 58-25556 | 8/1981 |
| JP | 56-133597 | 10/1981 |

| JP | 58117995 | 7/1983 |
| JP | 61128024 | 6/1986 |
| JP | 63068759 | 3/1988 |
| JP | 02021123 | 1/1990 |
| JP | 02256856 | 10/1990 |
| JP | 03009058 | 1/1991 |
| JP | 04347410 | 12/1992 |
| JP | 07151402 | 6/1995 |
| JP | 07293334 | 11/1995 |
| JP | 09015197 | 1/1997 |
| JP | 02091463 | 1/2003 |
| WO | WO 90/08891 | 8/1990 |
| WO | WO 91/05949 | 5/1991 |
| WO | WO 99/40310 | 8/1999 |
| WO | WO 00/79114 A1 | 12/2000 |
| WO | WO 01/65100 A2 | 9/2001 |

OTHER PUBLICATIONS

Hargreaves, The Regenerator:, *The Phillip's Stirling Engine*, 1991, 9 pages.

*AAVID Thermal Technologies, Inc.*, Product Selection Guide, Jan. 1996, 4 pages.

Fleming, et al. *Rapid Recharge Capability of Valve Regulated Lead Acid Batteries for EV & HEV Applications*, 9 pages.

Anderson, et al. The Effects of APU Characteristics on the Design of Hybrid Control Strategies for Hybrid Electric Vehicles, *SAE Technical Paper Series*, Feb. 27- Mar. 2, 1995, pp. 67-71.

Dickinson, et al. Performance, Management and Testing Requirement for Hybrid Electric Vehicle Batteries, *SAE Technical Paper Series*, Aug. 11-13, 1998, 11 pages.

Hochgraf, et al. Engine Control Strategy for a Series Hybrid Electric Vehicle Incorporating Load-Leveling and Computer Controlled Energy Management, *SAE Technical Paper Series*, Feb. 26-29, 1996, pp. 11-24.

Oman, H. New Energy Management Technology Gives Hybrid Cars Long Battery Life, *SAE Technical Paper Series*, Aug. 2-5, 1999, 8 pages.

Hobbs, R. Development of Optimized Fast Charge Algorithms for Lead Acid Batteries, *SAE Technical Paper Series*, Mar. 1-4, 1999, 9 pages.

Wiegman, H. Battery State Control Techniques for Charge Sustaining Applications, *SAE Technical Paper Series*, Feb. 23-26, 1998, pp. 65-75.

ISA/EP International Search Report and Written Opinion of the International Searching Authority, Sep. 29, 2005, 15 pages.

* cited by examiner

Figure 1: Venturi Burner on a Stirling-Cycle Engine

Figure 2: Burner Schematic

Figure 2A: Pressure Map

Figure 3: Detail of Venturi Ejector

Figure 4: Multiple Fuel Ports

Figure 4A: Multiple Fuel Restrictors

Figure 4B: Multiple Fuel System.

Figure 5: Automated Control for Variable Fuel Densities

Figure 6: Automated Control of Heater Head Temperature with Engine Speed

Figure 7: Automated Control of Heater Head Temperature with blower control and control of output power with engine speed and fuel control for variable fuel density.

Figure 8: Alternative Ejector

GASEOUS FUEL BURNER

PRIORITY

This application claims priority from U.S. Provisional Patent Application No. 60/568,629 entitled Gaseous Fuel Burner, filed on May 6, 2004 in the names of Kurt L. Kornbluth and Michael G. Norris, which is hereby incorporated herein by reference in its entirety.

TECHNICAL FIELD

The present invention relates to systems, methods, and apparatus for combusting fuel and air in a burner, more particularly for a gaseous fuel burner that uses an ejector and a heat exchanger to combust gaseous fuels in a system including an external combustion engine having a heater head.

BACKGROUND

A burner that supplies high temperature gases to a process or an external combustion engine should have high thermal efficiency, low emissions, good cold starting capabilities and a large turndown ratio or wide dynamic range. High thermal efficiency may be achieved by capturing the thermal power in the hot exhaust exiting the load-heat-exchanger. For example, in a Stirling engine, the exhaust gas exits the load heat exchanger or heater head at about 900° C. Typically, this thermal power is captured by preheating the incoming combustion air in a recuperative or regenerative heat exchanger. The preheated air typically enters the fuel mixing section at 500 to 800° C. Low emissions in burners are best achieved by vaporizing and mixing the fuel with the air before the mixture reaches the burner's combustion zone. In addition to producing high efficiency and low emissions with preheated air, the burner must be capable of being ignited and warmed-up with ambient temperature air. It is desirable that the burner be capable of good fuel/air mixing, quickly reach full power, and produce a stable flame over a wide range of air temperatures and fuel flows.

Supplying gaseous fuel to high efficiency burners presents a number of challenges. The major challenge is getting gaseous fuel supplied at low pressure into the high efficiency burners that typically operate at elevated pressures. Most of the common gaseous fuels such as propane, natural gas and biogas are generally supplied at low pressure, typically 3 to 13 inch of water column (in.w.c). The high efficiency burners operate at elevated pressures to overcome the pressure drops associated with the recuperative heat exchangers, the load heat exchanger and the mixing requirements of the burner. Typically, the air pressure upstream of the combustion chamber operates at pressures from 5 to 25 in.w.c. Existing gaseous fuel burners address these challenges by using gaseous fuel pumps possibly in combination with throttle devices. Gaseous fuel pumps are not commercially available below 100 kW thermal. If such pumps were built, they would also have to be approved by at least one listing agency. Furthermore, fuel pumps and throttles require additional power and controls all of which increase the cost of the final device, reduce the net power of engines and increase the energy costs to the burner systems. There is therefore the need for simple, efficient, and affordable solutions to delivering low-pressure gaseous fuel to high efficiency burners.

High efficiency recuperative burners are an important component to external combustion engines and other processes requiring heat at high temperatures. External combustion engine include steam engines and stirling engines. Thermal-Photovoltaic generators are an example of a non-engine high temperature load that would benefit from a high efficiency recuperative burner.

External combustion engines, for example Stirling cycle engines, have a long technical heritage. Walker, *Stirling Engines*, Oxford University Press (1980), describing Stirling cycle engines in detail, is incorporated herein by reference. The principle underlying the Stirling cycle engine is the mechanical realization of the Stirling thermodynamic cycle: isovolumetric heating of a gas within a cylinder, isothermal expansion of the gas (during which work is performed by driving a piston), isovolumetric cooling, and isothermal compression. Other external combustion engines are steam engines, organic Rankine engines and closed cycle gas turbine engines.

SUMMARY OF THE INVENTION

Accordingly, in various embodiments of the invention, we provide a gaseous fuel burner comprising an ejector with fuel supply, a blower, a combustion chamber and a heat exchanger, to address the challenges facing the existing burners. Certain embodiments of this gaseous fuel burner are capable of using low static pressure gaseous fuel without any substantial additional equipment or energy demands. Certain embodiments of the invention can maintain an approximately steady fuel-air ratio, thereby eliminating the need for separate fuel-air controls systems. In certain specific embodiments of the invention, the gaseous fuel burner may further include one or more of the following: a swirler, a fuel pressure regulator, an igniter and a flame-monitoring device. Further, in certain embodiments, the gaseous fuel burner may be a recuperative or regenerative burner that is coupled to an external combustion engine such as a Stirling cycle engine.

Ejectors are advantageously employed in embodiments of the present invention. In certain embodiments, the ejector is a venturi. In such embodiment, the input of the venturi may be connected to the hot end of a heat exchanger and the output of the venturi may be connected to a combustion chamber. Based on the operating principles of a venturi, the preheated air directed through the venturi creates a vacuum relative to the pressure in the combustion chamber. The dimensions of the venturi throat enable the vacuum to correspondingly rise with an increase in the airflow. A fuel delivery means may feed fuel to the burner through the venturi. A fuel restriction of the fuel delivery means is preferably located in a hot area of the heat exchanger such that the fuel temperature in the restriction is substantially similar to the combustion air temperature in the venturi. Furthermore, it is preferable to make the fuel inlet ports the largest restrictions in the fuel delivery system. The vacuum in the venturi entrains the fed fuel. In certain embodiments of the invention, air is directed into the burner by a swirler. The swirler, upstream of the venturi throat, directs preheated air for combustion through the venturi to create airflow. The swirler promotes a swirl stabilized flame and smoothes out any vacuum pulses that may occur in the venturi. Additionally, the swirler may improve the venturi performance by producing a larger vacuum at the throat for the same airflow and dimensions.

In certain embodiments of the invention, a simple multiport valve may allow a number of predefined gaseous fuels or very low energy density fuels to be combusted by the burner by simply setting a selector switch to the correct setting. In one embodiment, the valve can match the fuel to the appropriate restriction to create the desired fuel-air ratio.

In an alternate embodiment where the properties of the gaseous fuel may vary, the burner may use an exhaust sensor/ feedback control mechanism to adjust the fuel restriction to attain the fuel-air ratio and the maximum fuel efficiency of the engine for a wide range of fuels. In another embodiment where the properties of the gaseous fuel may vary, the burner may be lit with a fuel and then run on a different fuel. In a specific embodiment, a fuel selector may be used to switch between the different fuels. Furthermore, the gaseous fuel burner may have multiple fuel restrictions outside the burner to enable the switching of the burner fuels during operation.

In accordance with yet another embodiment of the invention, the burner is a high efficiency burner for an external combustion engine such as a Stirling cycle engine. In this embodiment, the burner includes manual controls to control the burner. The manual controls include a ball valve to manually select the fuel type and a manual rheostat to control the blower speed, and thus air flow. In this embodiment, when the burner is lit, increasing or decreasing the engine speed automatically controls the burner temperature. Furthermore, in this configuration, the burner temperature is held constant by varying the engine speed, the user selects the fuel type, and the power output is dependent on the blower setting. Alternatively, a manual trim valve may be added to the fuel line to adjust the fuel-air ratio to optimize the efficiency or emissions.

In accordance with another embodiment of the invention, a high efficiency burner for a Stirling engine uses an oxygen sensor, controller and variable restriction to continuously adjust fuel-air ratio. The oxygen sensor provides a feedback signal to the controller that adjusts the fuel restriction and thereby adjusts the fuel-air ratio. The burner further includes manual controls such as a manual rheostat to control the blower speed, and thus the airflow. In this embodiment, the burner temperature is held constant by varying engine speed and output power is dependent on blower setting.

In accordance with yet another embodiment of the invention, a high efficiency burner for a Stirling engine has a blower controller to match power output of the engine with the load. The burner has manual controls such as a ball valve to manually select the fuel type and a manual rheostat to control the blower speed, and thus air flow. The burner includes an oxygen sensor using a feedback loop detection mechanism to continuously adjust fuel-air ratio. In this embodiment, when the fuel is selected, the power output is automatically adjusted via blower speed to equal to demand. The burner temperature is held constant by varying engine speed.

BRIEF DESCRIPTION OF THE DRAWINGS

The foregoing features of the invention will be more readily understood by reference to the following detailed description, taken with reference to the accompanying drawings, in which.

DETAILED DESCRIPTIONS OF SPECIFIC EMBODIMENTS

Definitions: As used in this description and the accompanying claims, the following terms shall have the meanings indicated, unless the context otherwise requires: Fuel-Air Equivalence ratio ($\phi$)=Actual Fuel-Air Mass Ratio/Stoichiometric Fuel-Air Mass Ratio. The stoichiometric fuel-air mass ratio is defined as the mass ratio needed to balance the fuel+ air chemical equation. The stoichiometric fuel-air mass ratio is well known for common fuels such as propane (0.0638 g fuel/g air) and calculable for gases such as biogas.

Figure 1:
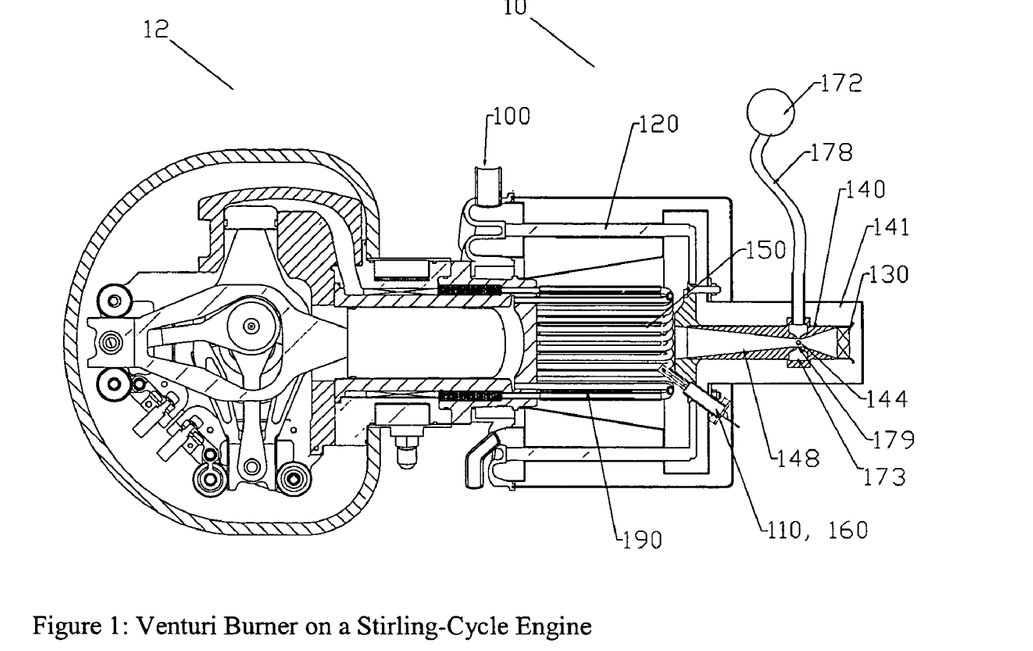
FIG. 1 is a cross-section of a gaseous fuel burner coupled to a Stirling cycle engine, where the ejector is a venturi, according to an embodiment of the invention.

FIG. 1 illustrates an embodiment of the invention in the exemplary application of a gaseous fuel burner system as a gaseous fuel burner 10 for a Stirling cycle engine 12. Although, this embodiment of the invention is described specifically in the context of a Stirling cycle engine, embodiments of the invention are not limited to such applications. Those skilled in the art will appreciate that the present invention may have application in other systems, such as, with other types of external combustion engines.

The use of an ejector in a gaseous fuel burner advantageously can solve some of the challenges faced by the traditional gaseous fuel burners, as described above. First, using an ejector can eliminate the need for additional equipment, controls, and space, such as, a gaseous fuel pump, fuel control circuitry, and the associated components. Furthermore, using an ejector such as a venturi simplifies the fuel control system by eliminating the need for a separate fuel control scheme. Based on the corresponding rise of the vacuum with the airflow, and subsequently, an increased fuel flow, the burner power can be regulated by regulating the airflow. Accordingly, removing separate fuel control simplifies the development and implementation of automatic burner control in a gaseous fuel burner with an ejector.

Secondly, the corresponding rise of the vacuum with airflow also results in an approximately steady fuel-air ratio despite changes in temperature and airflow rates. The resulting steady fuel-air ratio simplifies the fuel control and operation of the burner, by eliminating the need for complex exhaust sensor/feedback fuel control mechanisms.

Referring to FIG. 1, a gaseous fuel burner 10 comprises an ejector 140, a heat exchanger 120, a combustion chamber 150, and a blower 100. The term ejector as used here includes eductors, siphons, or any device that can use the kinetic energy of one fluid to cause the flow of another fluid. Ejectors are a reliable way of producing vacuum-based fuel flow systems with low initial cost, lack of moving parts, and simplicity of operation.

Referring again to FIG. 1, in a preferred embodiment the ejector 140 is a venturi. The venturi 140 is positioned downstream of the outlet of the air preheater or heat exchanger 120, in a venturi plenum 141 and proximal to the combustion chamber 150. A blower 100 forces air through the venturi 140. The flow of air through the venturi draws in a proportional amount of fuel through the fuel inlet ports 179. The fuel inlet ports 179 are placed at the venturi throat 144 where the throat has the lowest pressure. The ports 179 are sized to produce plumes of fuel across the airflow that promote good mixing within the venturi 140. This fuel-air mixture exits the venturi 140 and forms a swirl-stabilized flame in the combustion chamber 150. The venturi 140 draws in an amount of fuel that is substantially linearly proportional to the airflow regardless of airflow rates and temperature of the air entering the venturi 140.

Figure 2:
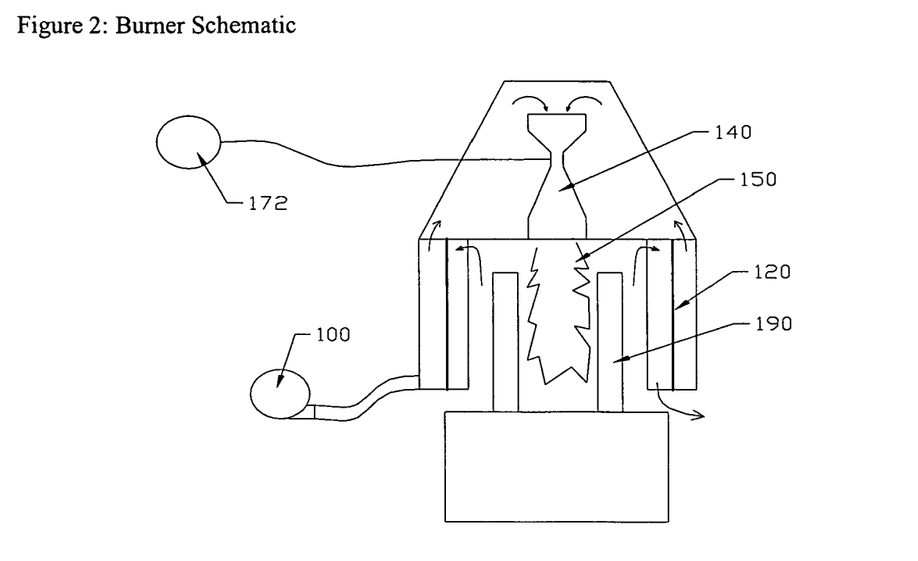
FIG. 2 is a schematic of the burner of FIG. 1 showing the air and fuel flow paths.
Figure 2A:
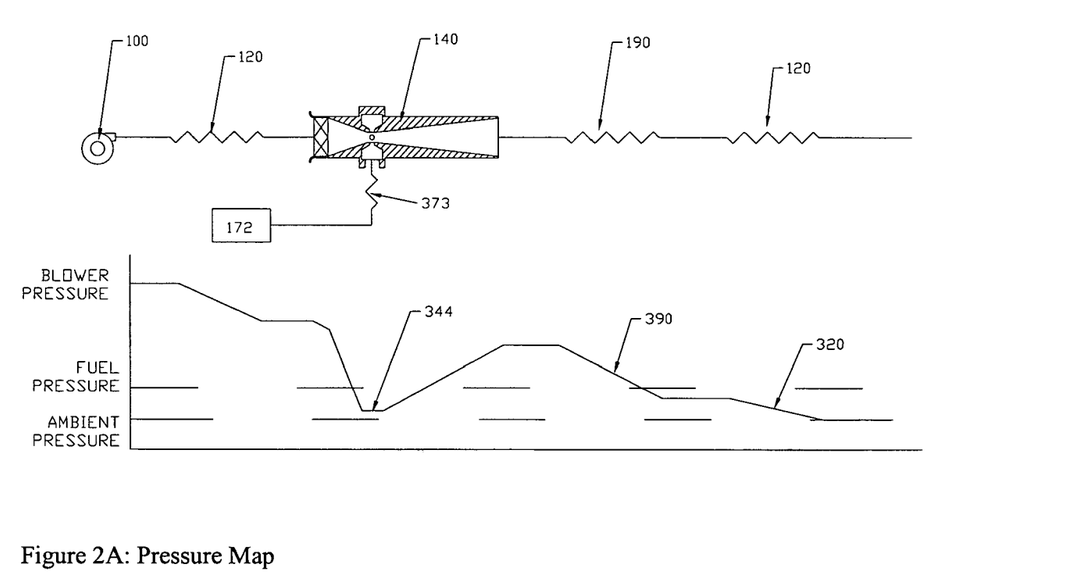
FIG. 2A is a graphical representation of the pressure across the burner.

In a preferred embodiment of the invention as shown in FIGS. 2 and 2A, placing the venturi 140 between the air preheater 120 and the combustion chamber 150 promotes a substantially steady air-fuel ratio over a wide range of airflows and venturi temperatures. FIG. 2 is a schematic drawing of the burner including the components of the burner such as a blower 100, a preheater 120, a venturi 140, and fuel supply 172. The drawing also includes a load heat exchanger or heater head 190. The load heat exchanger 190 is the heat exchanger of the engine or process that absorbs the thermal power of the hot gases leaving the combustion chamber 150 in the burner at some elevated temperature. The partially cooled burned gases then enter the exhaust side of the air preheater, where they are further cooled by incoming combustion air. FIG. 2A shows the pressure map of the same components arranged linearly. The air pressure supplied by the blower, the fuel supply pressure, and the ambient pressure are all indicated. The mass flow rate (m') of fuel into the burner is controlled by the difference between the fuel supply pressure at 172 and the pressure in the venturi throat 144 and the fuel temperature at the dominant restriction:

$$m'_{FUEL} \propto (P_{FUEL} - P_{THROAT})^{0.5} / T_{FUEL}^{0.5}$$

The pressure in the throat ($P_{THROAT}$) is set by the pressure drop through the exhaust side of the preheater 320 plus the pressure drop through the heater head tubes 390 minus the suction generated by the venturi throat 344. The pressure drops 320, 390 and the throat suction pressure 344 are all proportional to the airflow rate and the venturi temperature.

$$P_{THROAT} \propto m'_{AIR}{}^2 * T_{VENTURI}$$

Combining these equations shows that the fuel flow will vary approximately linearly with the airflow:

$$m'_{FUEL} \propto [P_{FUEL} - (m'_{AIR}{}^2 * T_{VENTURI})]^{0.5} / T_{FUEL}^{0.5}$$

Regulating the fuel pressure to near ambient pressure, the fuel flow is approximately linear with airflow.

$$m'_{FUEL} \propto m'_{AIR} * (T_{VENTURI} / T_{FUEL})^{0.5}$$

Thus, locating the dominant fuel restriction 178 within the venturi plenum 141 provides for an approximately steady fuel-air ratio over a wide range of airflow rates and venturi temperatures.

$$m'_{FUEL} / m'_{AIR} \propto \text{constant}$$

Figure 3:
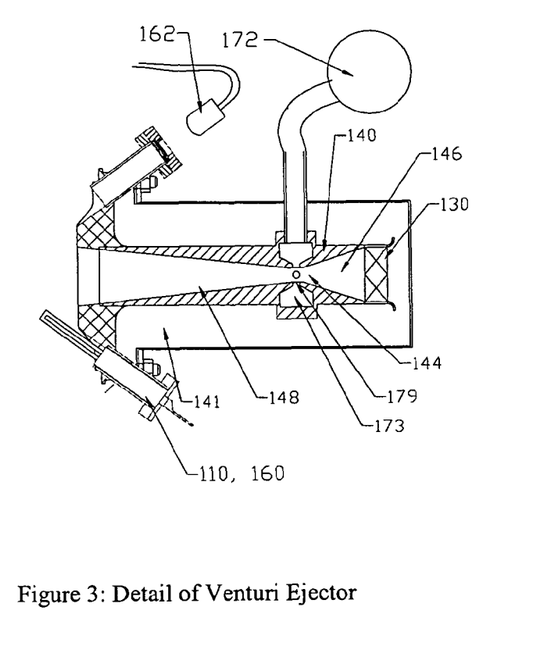
FIG. 3 shows a detailed view of a venturi as shown in the burner of FIG. 1.

FIG. 3 shows a preferred embodiment of the ejector such as the venturi. In this embodiment, the size of the opening of the venturi throat 144 determines the amount of suction present at the throat 144. In a specific embodiment of the invention, the venturi throat is approximately 0.24 inches in diameter. Referring back to FIGS. 1 and 3, fuel delivery means are coupled to the venturi 140. The fuel delivery means may be manifolds, fuel lines or fuel tubes. The fuel delivery means may include other components such as a fuel restriction 178, fuel inlet ports 179 and fuel valves (not shown). Fuel supplied by a pressure regulator 172 flows through a manifold 173 and fuel inlet ports 179 into the relatively lower pressure in the throat 144. In a preferred embodiment the fuel inlet ports 179 provide the largest portion of the pressure drop in the fuel delivery means. Preferably, making the fuel inlet ports 179 largest restriction in the fuel delivery means assures that the restriction occurs at the venturi temperature and maximizes fuel-air mixing by producing the largest possible fuel plumes. Referring back to FIG. 1, the fuel and air flow into the divergent cone or diffuser 148 of the venturi, where static pressure is recovered. In the diffuser 148, the entrained fuel mixes with the air to form an ignitable fuel air mixture 152 in the combustion chamber 150. The ignitable fuel-air mixture 152 then enters the combustion chamber 150, where the igniter 110 may ignite the mixture, and the tangential flow induced by a swirler 130 creates a swirl-stabilized flame. Using an ejector 140 to draw the gaseous fuel into the combustion chamber eliminates the need for a high-pressure gaseous fuel pump to deliver the fuel.

In a preferred embodiment, the venturi 140 is constructed from high temperature materials to withstand high temperatures and maintain its structural integrity. For the embodiment of FIG. 3, the dimensions of the venturi can be approximately 0.9 inches diameter inlet and outlets with an approximately 0.24 inches diameter throat. The half angles of the convergent cone and divergent cones can be 21° and 7° respectively and the throat can be 0.25 inches long. In this embodiment, the venturi can be constructed from Inconel 600. Alternatively, other high temperature metals could be used including, but not limited to Stainless Steels 310, 316L, 409 and 439, Hastalloy C76, Hastalloy X, Inconel 625 and other super alloys. In a preferred embodiment, as shown in FIG. 1, a swirler 130 is located upstream of the venturi 140 and advantageously creates a tangential flow of air through the venturi. As is well known in the art, the tangential flow from the swirler can create an annular vortex in the combustion chamber, which stabilizes the flame. Additionally, the swirler 130 increases the suction pressure at the venturi throat 144 by increasing the local air velocity over the fuel inlet ports 179. Adding the swirler allows the venturi throat 144 to be made larger for a given suction pressure. Furthermore, the swirling action induced by the swirler 130 can suppress fluctuations in the combustion chamber pressure from propagating upstream to the venturi 140. Such pressure fluctuations can temporarily slow or stop the flow of fuel gas into the venturi 140. The swirler 130 thereby facilitates a steady fuel-air ratio in the combustion chamber for steady airflows. The swirler 130 may be a radial swirler.

Figure 4:
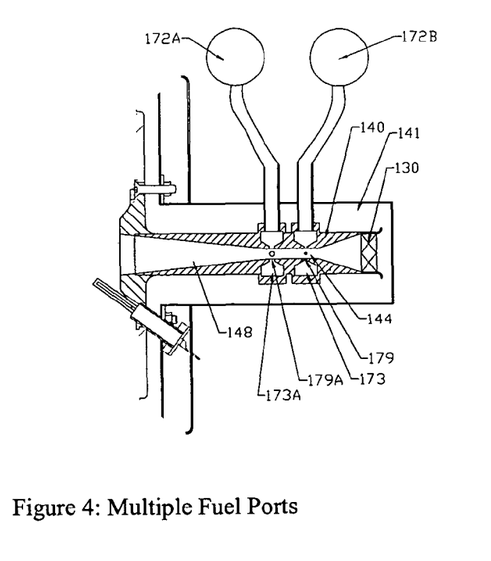
FIGS. 4 and 4A are embodiments of the venturi in FIG. 1.
Figure 4A:
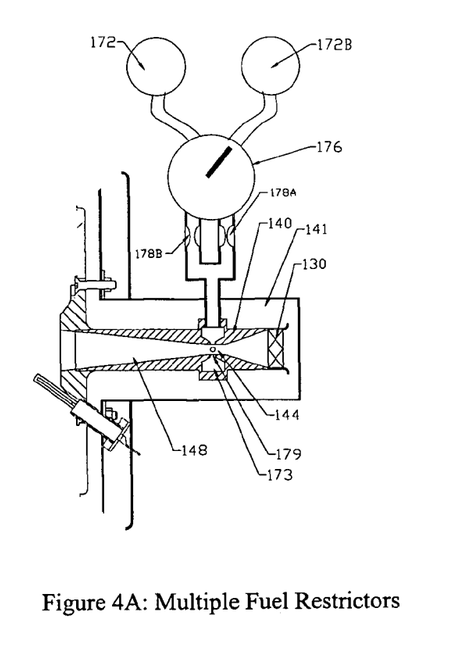
Figure 4B:
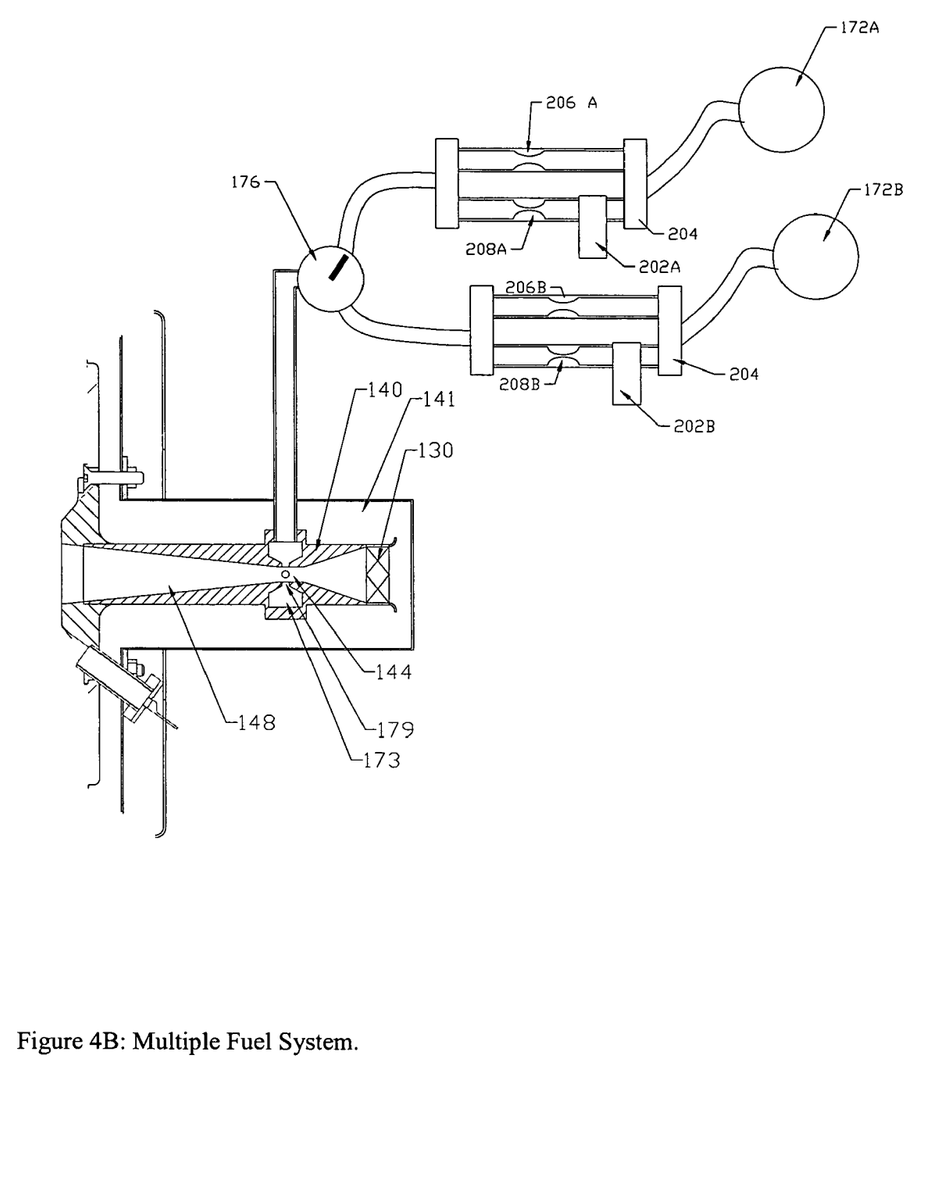
FIG. 4B shows a schematic of a multiple fuel system with multiple fuel restrictions and valves.

In other embodiments, the gaseous burner can be connected to multiple fuel sources. In this configuration, the burner may be fired, lit or ignited with a type of fuel and then run with a different type of fuel. The use of multiple fuel sources may require a fuel delivery means tuned for each fuel. FIGS. 4, 4A and 4B show embodiments for two fuels with significantly different energy densities such propane and natural gas. In this preferred embodiment, the fuel delivery means for the denser propane must be approximately three times more restrictive than the fuel delivery means for the less dense natural gas or methane. In the embodiment shown in FIG. 4, the venturi has different manifolds and fuel ports for each fuel. High-density fuels such as propane would require the more restrictive fuel inlet ports 179, while a low-density fuel such as natural gas would require less restrictive fuel inlet ports 179A. This configuration retains the highest resistance to fuel flow at the venturi temperature. However, the embodiment of the venturi in FIG. 4 may be more difficult to manufacture and have a higher-pressure loss drop due to the long narrow passage.

Another embodiment for a gaseous burner with multiple fuel sources is shown in FIG. 4A. In this embodiment, a fuel selector valve 176 directs the fuel through an additional fuel restriction such as 178A or 178B for a dense gas or a less dense gas respectively. The multi-port valve 176 allows any number of predefined gases to be burned by the same burner. Predefined gases such as natural gas, liquid petroleum gas (LPG) or biogas can be burned in the same burner by simply setting a selector valve to the corresponding fuel setting. Alternatively, other embodiments can have multiple settings for different qualities of biogas as the carbon dioxide fraction in biogas can vary from 50% to 20%. The fuel restrictors may be placed outside the burner as shown in FIG. 4A or alternatively they can be located in the entrances to the manifold 173. If restrictions 178 are placed outside of the burner, then significant part of the fuel-delivery-means pressure drop is not at the venturi temperature and thus the fuel-air ratio may vary with the venturi temperature. The burner will run initially leaner and get progressively richer as the hotter faster air flowing through the venturi exerts a stronger vacuum on the fuel. In addition, moving a significant part of the pressure drop from the fuel ports 179, the fuel will not penetrate as far into the air stream. Nevertheless, locating multiple restrictors 178 for different gases may make the fabrication of the part easier.

An alternative embodiment, that provides significant flexibility in the fuel-air ratio control and fuel gas usages, is shown in FIG. 4B. In this embodiment, the two fuel sources, 172A and 172B are regulated to their individual pressure and flows though separate fuel delivery means adjusted for each fuel. Each fuel delivery means includes two or more restrictions in parallel 206A and 208A with one or more valves 202A to vary the pressure drop of the fuel delivery means. The valves may be manually or automatically actuated. Fuel selector 176 connects fuel delivery means to the venturi, while closing the other fuel off.

The multiple restrictions 206A and 208A and the valves 202A allow the pressure drop of the fuel delivery means to be adjusted during burner warm-up. Thus the fuel-air ratio can be roughly maintained as the suction pressure increases with increasing venturi temperature. The multiple restrictions can also adjust for changing fuel gas density. A changing fuel gas density may occur when the gaseous fuel burner is connected to biogas digester, wherein the biogas digester is the source of fuel. In a biogas digester embodiment, the carbon dioxide ($CO_2$) content and therefore the energy density, can vary weekly. In this embodiment, if the $CO_2$ content increases, the pressure-drop through the fuel delivery means must be reduced to allow higher flows of the less energy dense fuel gas. In addition, the multiple restrictions can improve the ignition of the fuel gas by providing a richer fuel-air mixture for lighting. The richer mixture is provided by opening additional valves 202A, which also reduces the pressure-drop of the fuel delivery means. Once the burner is lit, the valve 202A may be closed to produce a leaner flame. As described supra, once the burner is lit, the burner may be run on a different fuel. A fuel selector may be used to switch the fuel types. Alternatively, an embodiment with a multiple fuel selector facilitates varying the fuel-air ratio during the operation of the burner.

Now referring to FIGS. 4A and 4B, the fuel selector 176 may enable the burner to be lit on one fuel and run on a different type of fuel. This can be important if one fuel is too weak to ignite, but will burn in a warmed up burner. In one example, the burner might be lit on a higher density fuel such as propane. Once the burner is warmed up, the fuel selector 176 is moved to draw in a low-density biogas.

Figure 5:
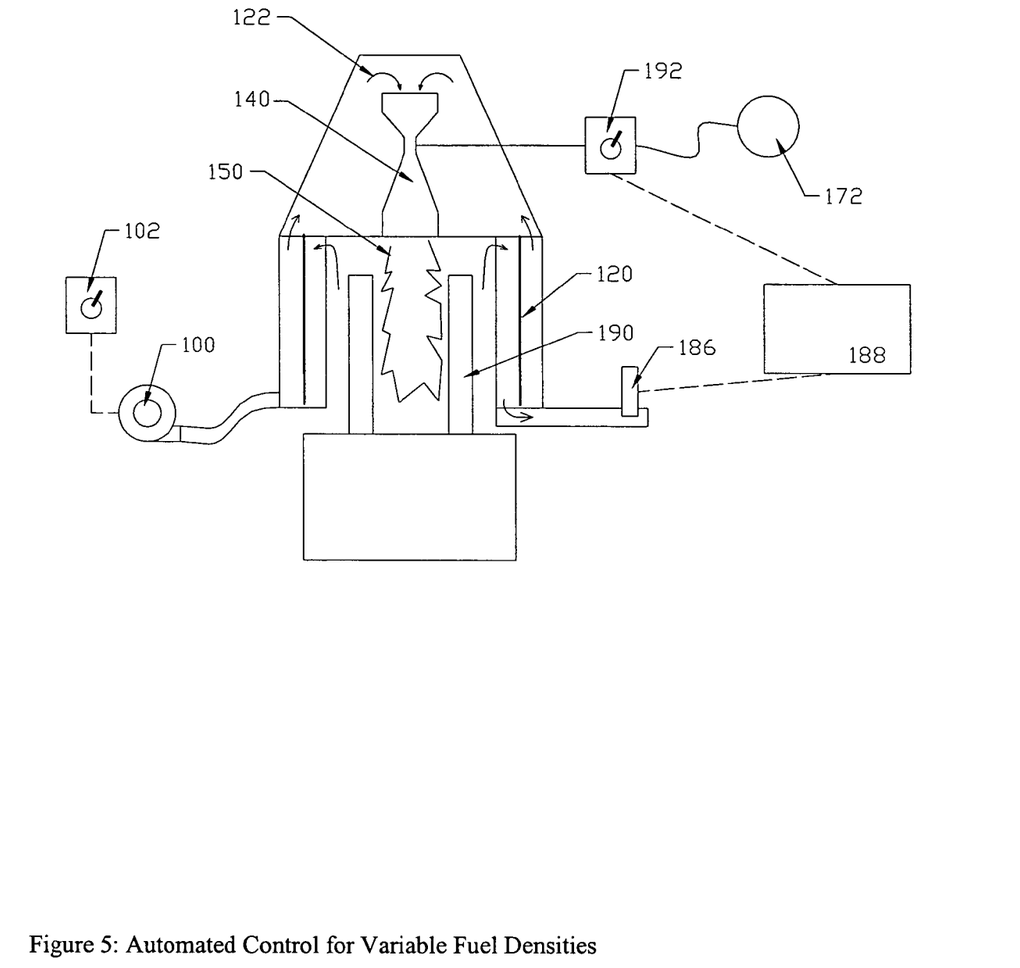
FIG. 5 shows a schematic of an embodiment of the burner with automated fuel control for variable fuel properties.

FIG. 5 depicts an embodiment where an automated controller 188 adjusts a variable restriction 192 such as a variable flow valve in the fuel delivery means to hold the exhaust oxygen constant as measured by a wide-range lambda sensor or UEGO 186. In this embodiment, the automated scheme allows any fuel from biogas to propane to be connected to the burner and the control system can compensate for the changing fuel density. In this embodiment, the automated controller can restrict the fuel path for dense fuels such as propane and open up the fuel path for low-density fuels such as methane and biogas. Ignition would be accomplished by starting the variable restrictor 192 in the fully open position, which will produce the richest mixture then closing it until the fuel-air mixture is ignited. After ignition, the controller can control the fuel flow to achieve the desired exhaust oxygen level. It is also envisioned that such an embodiment would allow the fuel air ratio to be adjusted during warm-up to optimize efficiency and burner stability.

Figure 6:
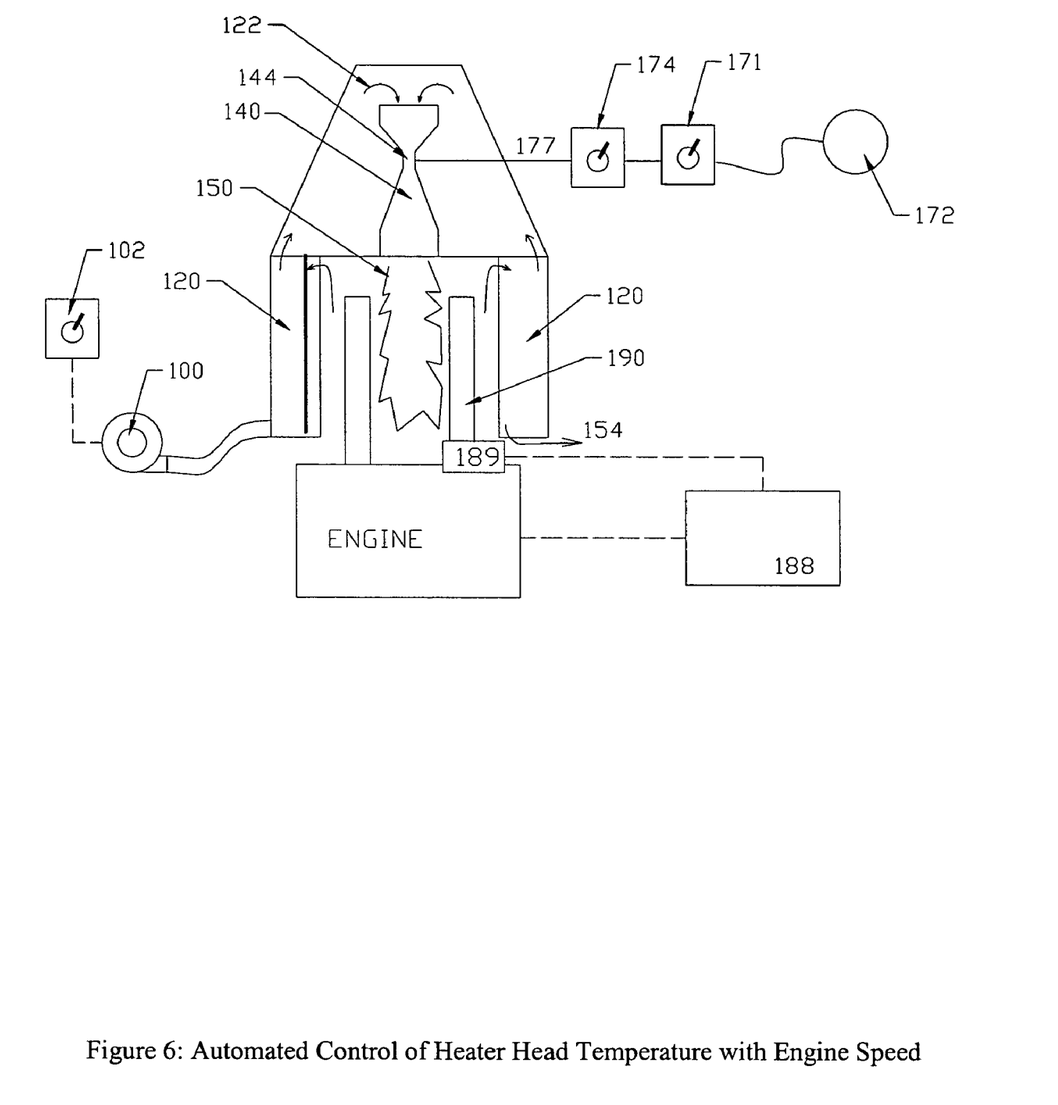
FIG. 6 shows a schematic of another embodiment of the burner with temperature sensor and engine speed control loop.

In another embodiment of the invention as shown in FIG. 6, the gaseous fuel burner is a high efficiency burner for an external combustion engine such as a Stirling cycle engine. The burner includes manual controls to control the burner. The manual controls include a ball valve 170 to manually select a fuel type, a trim valve 174 to adjust the fuel-air ratio and a rheostat 102 to control the blower speed, and subsequently the airflow. The preheated air 122 in the venturi 140 draws in the fuel from a fuel source 172. The fuel then mixes with the preheated air to create a fuel-air mixture. The fuel-air mixture flows into the combustion chamber 150 where it burns. In this embodiment a microprocessor/controller 188 holds the heater head temperature constant as measured by the temperature sensor 189 by varying the engine speed. Furthermore, the blower-speed determines the burner power output and thus the engine power output. In an alternative embodiment, the fuel trim valve 174 is not included.

Figure 7:
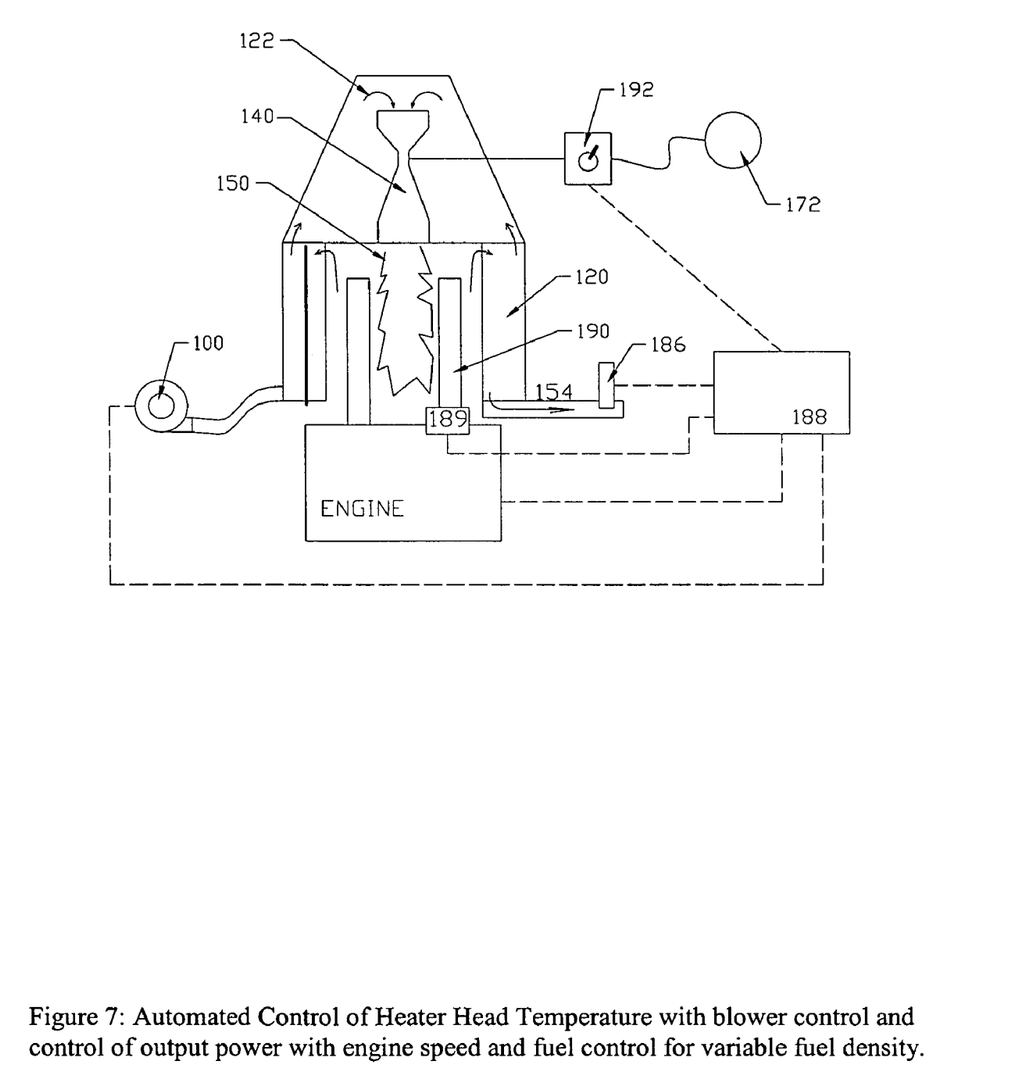
FIG. 7 shows a schematic of yet another embodiment of the burner with temperature sensor and oxygen sensor control loop.

Referring now to FIG. 7, the gaseous fuel burner 10 is a high efficiency burner for an external combustion engine such as a Stirling cycle engine. In this embodiment, the burner includes an oxygen sensor 186 located in the exhaust stream 184 and a microprocessor/controller 188 to automatically restrict the fuel flow with the variable restrictor 192. Additionally, the burner includes a blower controller 102. The blower controller 102 can be adjusted by the microprocessor/controller 188 to match the Stirling engine power output with the load. In this embodiment, the burner temperature is held constant by varying the engine speed and the engine power output is automatically adjusted by setting the blower speed. Accordingly, in this embodiment, the burner can burn most gaseous fuels, including fuels without constant properties such as biogas.

Figure 8:
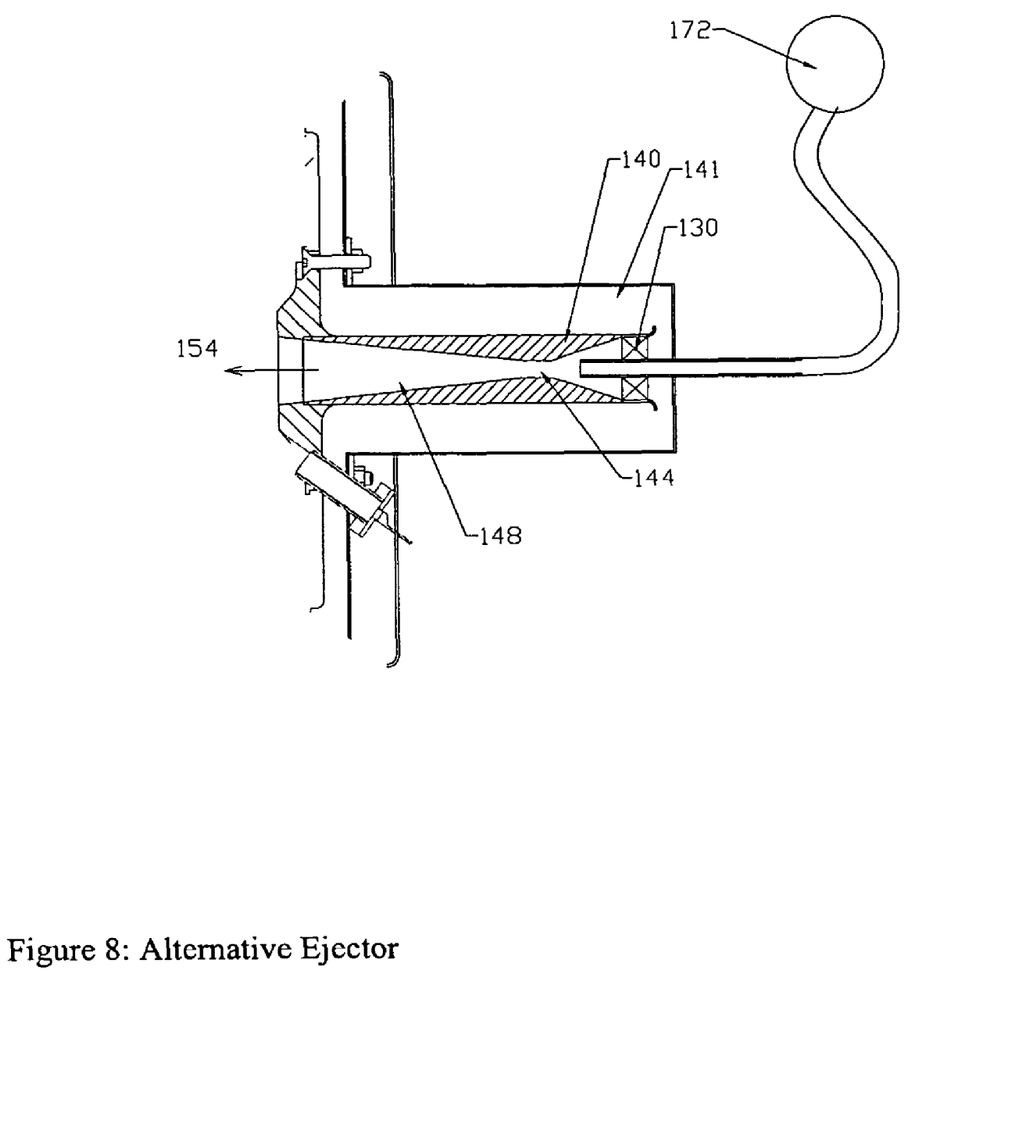
FIG. 8 shows an alternative embodiment of the ejector wherein the fuel is fed directly into the ejector.

In another embodiment as shown in FIG. 8, fuel is delivered directly into the venturi at a point proximal to the venturi throat 144. This embodiment includes a swirler 130 to accommodate the fuel delivery means such as a fuel line or fuel tube. The swirler 130 is preferably an axial swirler positioned in the venturi 140 and upstream of the venturi throat 144. In operation, the delivered fuel is entrained with the motive air to form the fuel-air mixture 152. The exemplary manual or automatic control mechanisms are adaptable to this alternate fuel delivery embodiment.

Referring back to FIG. 3, the gaseous fuel burner further comprises an igniter 160 and a flame-monitoring device 110. Preferably, the igniter 160 is an excitable hot surface igniter that may reach temperatures greater than 1150° C. Alternatively, the igniter 160 may be a ceramic hot surface igniter or an excitable glow pin.

With continuing reference to FIG. 3, other embodiments of the invention include a flame-monitoring device 110. The flame-monitoring device 110 provides a signal in the presence of a flame. For the safe operation of the any burner, it is important that the fuel be shut-off in the event of a flameout. The monitoring device for flame sensing is the flame rectification method using a control circuit and a flame rod.

Flame rectification, well known in the art, is the preferred flame sensing approach for the small, high efficiency gas burners. The device uses a single flame rod to detect the flame. The flame rod is relatively smaller than the grounded heater head and it is positioned within the combustion flame. In this flame rectification embodiment, the control unit electronics are manufactured by Kidde-Fenwal, Inc., and the flame rod is commercially available from International Ceramics and Heating Systems Preferably, the flame-monitoring device uses the hot surface igniter as the flame rod. Alternatively, the flame-monitoring device may be either remote from the hot surface igniter, or packaged with the igniter as a single unit.

Alternatively, an optical sensor may be used to detect the presence of a flame. A preferred sensor is an ultraviolet sensor with a clear view of the flame brush through an ultraviolet transparent glass and a sight tube.

All of the devices, systems, and methods described herein may be applied in other applications besides the Stirling or other thermal cycle engine in terms of which the invention has been described. The described embodiments of the invention are intended to be merely exemplary and numerous variations and modifications will be apparent to those skilled in the art. All such variations and modifications are intended to be within the scope of the present invention as defined in the appended claims.

We claim:

1. Apparatus for preparing a fuel-air mixture for combustion, the apparatus comprising:
   a blower for providing air at an elevated pressure;
   an air pre-heater coupled between the blower and an air inlet for pre-heating the air from the blower prior to entering an ejector, wherein the air pre-heater is a regenerative heat exchanger and wherein the heat exchanger pre-heats the air using at least some heat recaptured from a combusted fuel-air mixture; and
   an ejector comprising:
      an air inlet coupled to receive the air from the blower;
      at least one fuel inlet coupled to a fuel delivery system, wherein the fuel delivery system includes a fuel restriction for carrying fuel to at least one fuel inlet, and wherein the fuel restriction is proximal to a hot portion of the air pre-heater for pre-heating the fuel prior to entering the ejector; and
      an outlet for providing a fuel-air mixture, wherein air flow through the ejector produces a suction that draws fuel from the at least one fuel inlet, the amount of fuel drawn from the at least one fuel inlet being a function of the air flow through the ejector and wherein the ejector comprising a venturi.

2. Apparatus according to claim 1, wherein the ejector comprises an eductor.

3. Apparatus according to claim 1, wherein the ejector comprises a siphon.

4. Apparatus according to claim 1, further comprising: a blower controller for manually or automatically controlling the blower speed.

5. Apparatus according to claim 1, further comprising:
   a swirler in cooperation with the ejector, the swirler producing a substantially tangential flow of air through the ejector so as to increase the suction by increasing local air velocity over the at least one fuel inlet.

6. Apparatus according to claim 5, wherein the swirler is one of a radial swirler and an axial swirler.

7. Apparaths according to claim 5, wherein the swirler is positioned within the ejector relatively upstream from a throat of the ejector.

8. Apparatus according to claim 5, further comprising:
   a combustion chamber for receiving and combusting the fuel-air mixture, wherein the swirler creates a swirl-stabilized flame in the combustion chamber.

9. Apparatus according to claim 1, wherein the at least one fuel inlet includes a separate fuel inlet for each of a plurality of fuels, and wherein the fuel delivery system includes a fuel selector coupled to a plurality of fuel supplies for providing fuel from a selected one of the fuel supplies to a corresponding fuel inlet.

10. Apparatus according to claim 1, wherein the fuel delivery system includes a fuel selector coupled to a plurality of fuel supplies for providing fuel from a selected one of the fuel supplies to a common ejector inlet, the fuel selector including a separate restrictor for each of the fuels.

11. Apparatus according to claim 1, wherein the fuel delivery system includes a variable fuel restriction for manually or automatically controlling the amount of fuel provided to the ejector.

12. Apparatus according to claim 1, further comprising:
   a combustion chamber for receiving and combusting the fuel-air mixture.

13. Apparatus according to any of claim 12 or 8, further comprising an igniter for igniting the fuel-air mixture in the combustion chamber.

14. Apparatus according to any of claim 12 or 8, wherein the burner is operated on at least two fuels, and wherein the burner is lit on at least one type of fuel and is run on a different type of fuel.

15. Apparatus according to claim 14, wherein a fuel selector valve is used to switch between the different fuels used for lighting the burner and running the burner.

16. Apparatus according to any of claim 12 or 8, further comprising:
   a flame-monitoring device for providing a signal indicating a loss of flame in the combustion chamber; and
   a controller, in communication with at least the flame-monitoring device and the fuel delivery system, for automatically terminating fuel flow to the ejector upon receipt of said signal.

17. Apparatus according to claim 16, wherein the flame-monitoring device is one of:
   an optical sensor;
   an ultraviolet sensor; and
   a flame rod.

18. Apparatus according to any of claim 12 or 8, further comprising:
   an exhaust gas sensor for providing a signal indicating a characteristic of the combusted fuel-air mixture; and
   a controller, in communication with the exhaust gas sensor and at least one of the blower and the fuel delivery system, for automatically adjusting at least one of the blower speed and the fuel flow based on said characteristic.

19. Apparatus according to claim 18, wherein the exhaust gas sensor is an oxygen sensor.

20. Apparatus according to any of claim 12 or 8, further comprising:
   a thermal load coupled to receive the combusted fuel-air mixture from the combustion chamber.

21. Apparatus according to claim 20, wherein the thermal load comprises an external combustion heat engine.

22. Apparatus according to claim 21, wherein the external combustion engine is a Stirling cycle engine.

23. Apparatus according to claim 21, further comprising:
a temperature sensor for providing a signal indicating a heater head temperature of the external combustion engine; and
a controller, in communication with the temperature sensor and the external combustion engine, for varying the engine speed based on said signal in order to maintain a substantially constant heater head temperature.

24. Apparatus according to claim 23, wherein the controller is further in communication with the blower, and wherein the controller automatically adjusts the blower speed to control engine power output.

25. Apparatus according to claim 1, wherein the at least one fuel inlet is positioned substantially at a throat of the ejector.

26. Apparatus according to claim 1, wherein the at least one fuel inlet is positioned inside the ejector to deliver fuel relatively upstream of a throat of the ejector.

27. A gaseous fuel burner for combusting a fuel-air mixture, gaseous fuel burner comprising:
a blower for providing air at an elevated pressure;
an air pre-heater coupled between the blower and an air inlet for pre-heating the air from the blower prior to entering an ejector, wherein the air pre-heater is a regenerative heat exchanger and wherein the heat exchanger pre-heats the air using at least some heat recaptured from a combusted fuel-air mixture;
an ejector comprising:
an air inlet coupled to receive the air from the blower;
at least one fuel inlet coupled to a fuel delivery system, wherein the fuel delivery system includes a fuel restriction for carrying fuel to at least one fuel inlet, and wherein the fuel restriction is proximal to a hot portion of the air pre-heater for pre-heating the fuel prior to entering the ejector; and
an outlet for providing a fuel-air mixture; and
a combustion chamber for receiving and combusting the fuel-air mixture, wherein air flow through the ejector produces a suction that draws fuel from the at least one fuel inlet, the amount of fuel being a function of the air flow through the ejector, and wherein the gaseous fuel burner does not include a separate high-pressure fuel pump for delivering fuel to the ejector and wherein the ejector comprising a venturi.

28. A gaseous fuel burner according to claim 27, wherein the ejector selected from the group comprising:
an eductor; and
a siphon.

29. A gaseous fuel burner according to claim 27, further comprising:
a blower controller for manually or automatically controlling the blower speed.

* * * * *